May 15, 1928.

W. M. GAMBILL

ARTICULATOR

Filed Nov. 29, 1926    3 Sheets-Sheet 1

1,669,462

INVENTOR.
William M. Gambill,
BY
Geo. T. Kimmel    ATTORNEY.

May 15, 1928.  
W. M. GAMBILL  
ARTICULATOR  
Filed Nov. 29, 1926  
1,669,462  
3 Sheets-Sheet 2

INVENTOR.  
William M. Gambill,  
BY  
Geo. P. Kimmel  
ATTORNEY.

May 15, 1928.

W. M. GAMBILL

ARTICULATOR

Filed Nov. 29, 1926

INVENTOR.
William M. Gambill,
BY
Geo. F. Kimmel ATTORNEY.

Patented May 15, 1928.

1,669,462

UNITED STATES PATENT OFFICE.

WILLIAM M. GAMBILL, OF MERKEL, TEXAS.

ARTICULATOR.

Application filed November 29, 1926. Serial No. 151,486.

This invention relates to a dental articulator, and has for its object to provide, in a manner as hereinafter set forth, an articulator of the class referred to, with adjustable means for efficiently grinding in the teeth to obtain a satisfactory occlusion for producing and perfecting the individual three point contact, the rotation point, the inward slant, the downward slant, and the incisal slant on the occlusal surfaces of the teeth.

A further object of the invention is to provide, in a manner as hereinafter set forth, an articulator having means to provide, combined oscillatory and vertical movements, during the grinding action and further with means for providing a retruded and a protruded bite.

A further object of the invention is to provide, in a manner as hereinafter set forth, a dental articulator for producing retruded and protruded movements and further with means for adjusting the retruded and protruded bites.

A further object of the invention is to provide, in a manner as hereinafter set forth, a dental articulator with a condyle shaft and new and novel means for adjusting the position of such shaft.

A further object of the invention, is to provide, in a manner as hereinafter set forth, a dental articulator with a new and novel form of incisal pin unit of the revolving type and having as a part thereof driven means for bodily revolving the unit and for vertically adjusting the unit.

Further objects of the invention are to provide, in a manner as hereinafter set forth, a dental articulator, which is comparatively simple in its construction and arrangement, strong, durable, adjustable, thoroughly efficient and convenient in its use, readily coupled with a driving means therefor, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
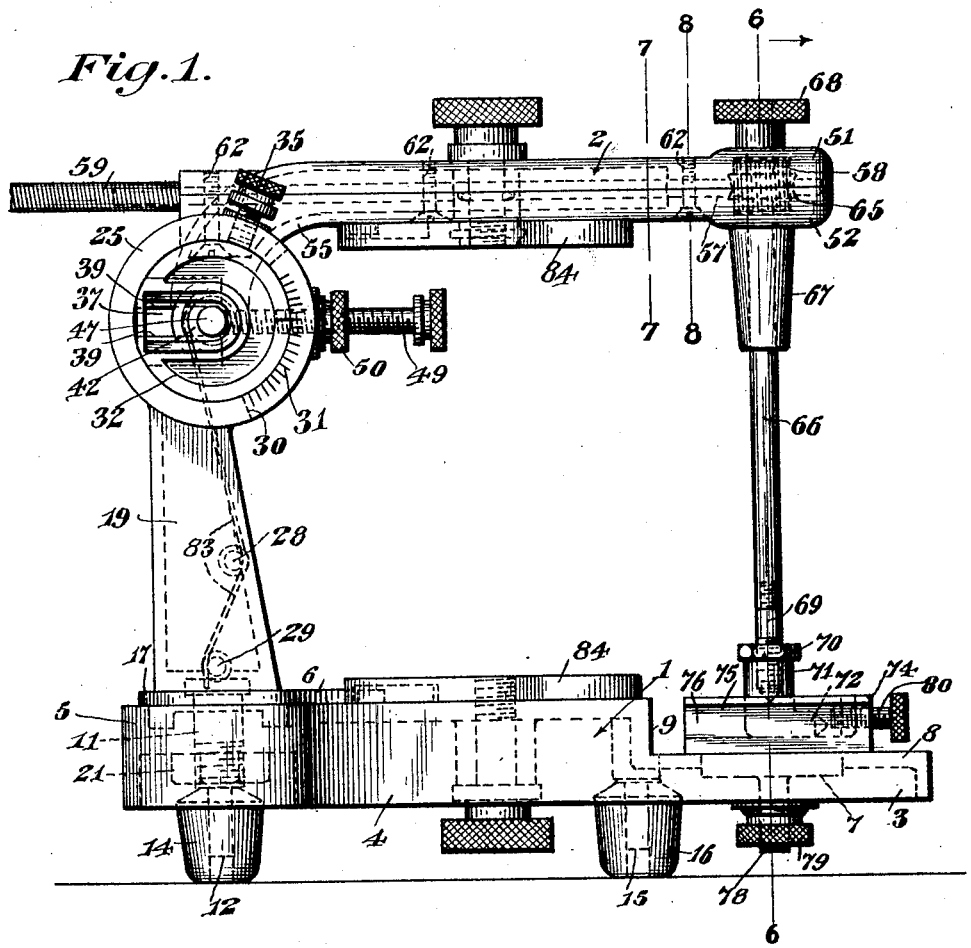
Figure 1 is a side elevation of a dental articulator, in accordance with this invention.
Figure 5:
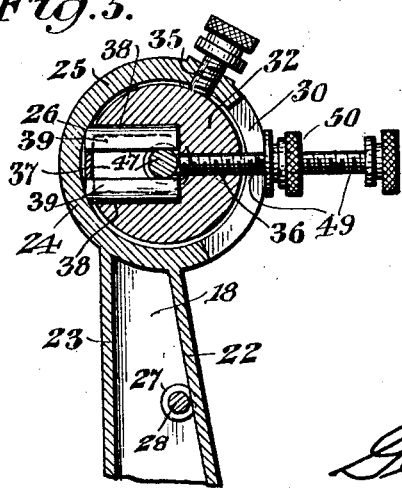
Figure 8:
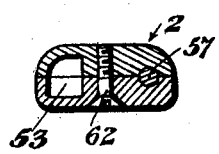
Figure 6:
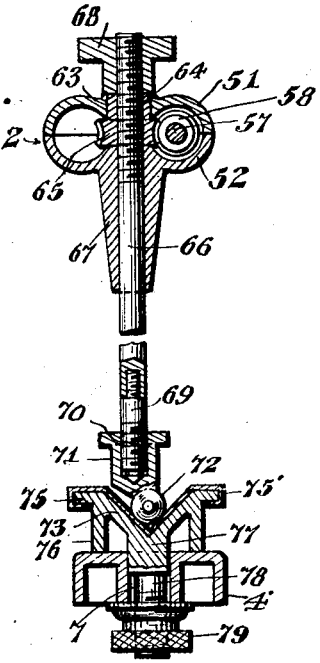
Figure 7:
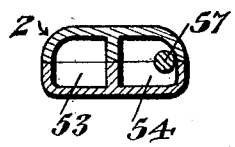
Figure 3:
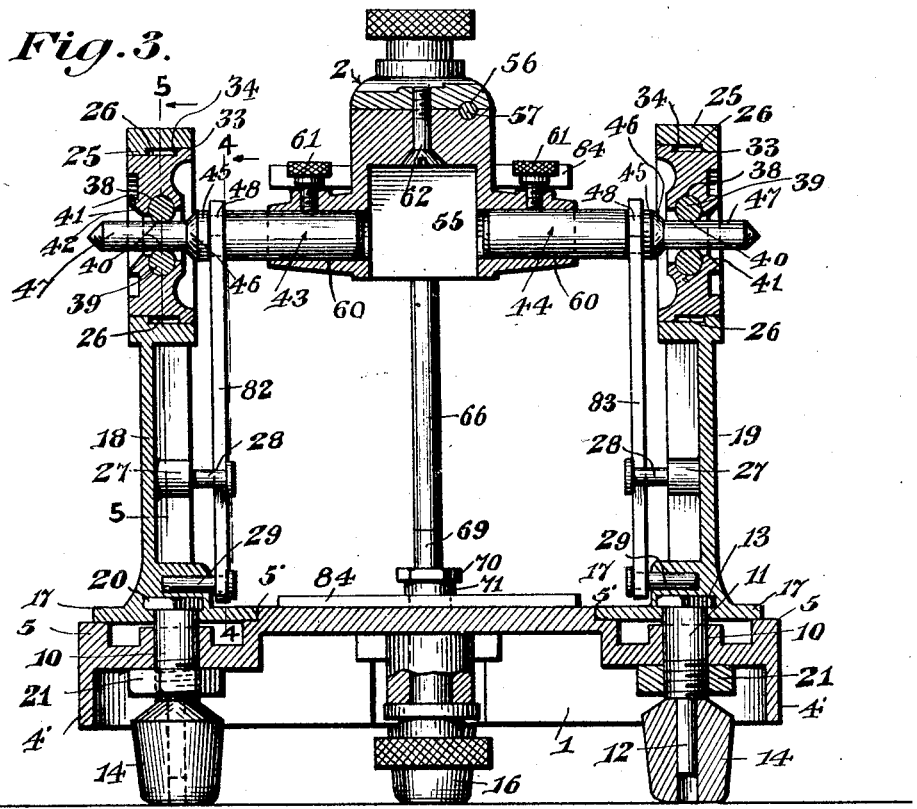
Figure 3 is a vertical sectional view at the rear thereof.
Figure 4:
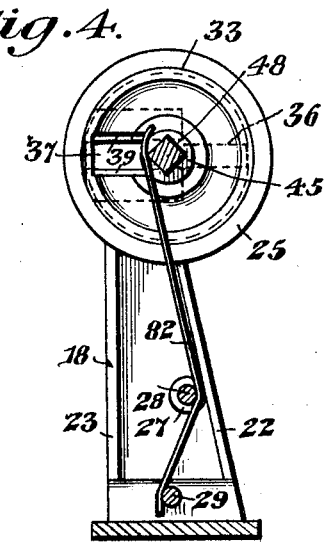

Figure 4 is a section on line 4—4 Figure 3.
Figure 5 is a section on line 5—5 Figure 3.
Figure 6 is a section on line 6—6 Figure 1.
Figure 7 is a section on line 7—7 Figure 1.
Figure 8 is a section on line 8—8 Figure 1.

Figure 9:
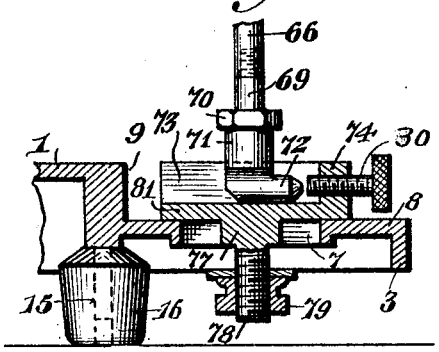

Figure 9 is a fragmentary view, in longitudinal section, illustrating an incisal guide unit and the lower portion of the revoluble incisal unit.

Referring to the drawings in detail 1 generally indicates the base or lower bow and 2 generally indicates the pivoted upper or oscillatory bow. The base 1 has its forward portion 3 of materially less height than the remaining portion 4 thereof. The upper face of the forward portion 3 is arranged below the upper face of the forward portion 4. The base 1 is formed with a depending flange 4' throughout. The base 1 at its rear, as indicated at 5, is of materially greater width than the intermediate portion or the forward portion 3 of the base 1. The rear part 5 of the base 1, at each end terminal thereof, is reduced to form a vertically disposed curved shoulder 5'. The shoulders 5' are oppositely disposed. The intermediate portion of the base 1, as indicated at 6 gradually increases in width towards the rear portion 5. The forward portion 3 of the base 1 is provided in its top with a lengthwise disposed slot 7, see Figure 7. The upper face of the forward portion 3, of the base 1, provides a seat 8 for a purpose to be presently referred to. The forward end of the high portion of the base 1, forms a vertically disposed stop or shoulder 9. Each reduced end terminal of the rear part 5, of the base 1, is formed with a vertically disposed opening 10, see Figure 3, and extending downwardly therethrough is a headed bolt 11 provided at its lower end with a reduced extension 12. The head of each bolt 11 is indicated at 13. Mounted on each extension 12 is a resilient cap member or foot piece 14. The forward end of that portion of greater height, indicated at 4, of the base 1, is formed centrally thereof with a depending extension 15 upon which is mounted a resilient cap or foot piece 16. The foot piece provides resilient or cushioning supports for the base 1.

Figure 2:
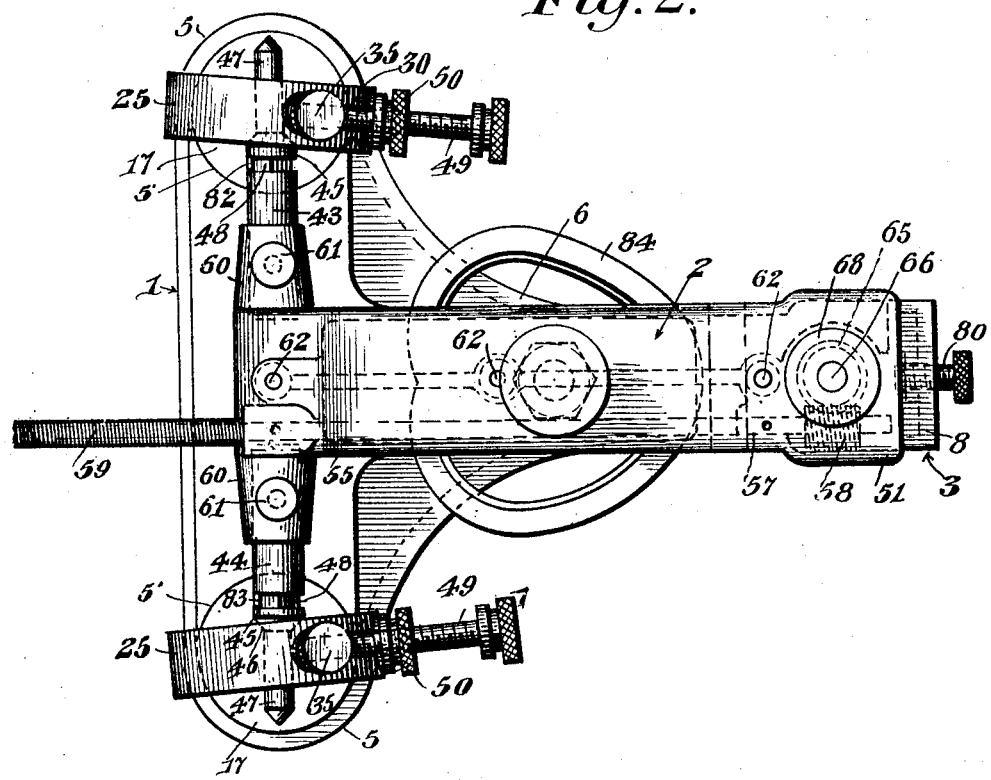
Figure 2 is a top plan view thereof.

Mounted upon the reduced end terminals of the rear portion 5, of the base 1, is a pair of standards 18, 19. Each standard is formed with a circular base 17 which abuts a shoulder 5'. The lower ends of the standards 18, 19 are provided with coacting sockets 20 for the reception of the heads 13 of the bolts 11, and also for the passage of the shanks of the bolts 11. The lower ends of the bolts 11 carry securing nuts 21 which abut against the lower face of the base 1. The bolts 11, in connection with the sockets 20 and nuts 21 provide means for fixedly clamping the plate 17 to the rear portion 5 of the base 1. The plate 17 can be disconnected from the base 1 when occasion requires. The standards 18 and 19 are of like construction, but oppositely disposed with respect to each other, and but one will be described, as the description of one will apply to the other. Each standard is formed at its front and rear with an inwardly extending vertically disposed flange 22, 23 coextensive with the standard and with the flange 23 extending slightly above the flange 22, see Figure 5. Each standard gradually decreases in width from its lower towards it upper end, and formed integral with the upper end of the standard, as well as the flanges thereof is a support 24, in the form of an annulus and which extends forwardly and rearwardly with respect to the standard, and projects a greater distance forward of the standard than rearward thereof. The inner face of the support 24, at the outer side thereof is formed with an inwardly extending annular flange 25 of appropriate width and thickness. The flange 25 provides the support of two inner diameters, and with that part of greatest inner diameter of greater cross sectional width than the part of smallest inner diameter. The providing of the support with the flange 25 forms the inner face of the support with a shoulder 26. Each standard has arranged therein, intermediate its ends, a boss 27, in which is secured an inwardly extending headed stud 28. The boss 27 is formed integral with the inner face of the front flange 22. Each standard has secured to the lower end thereof, an inwardly extending headed stud 29, which is arranged rearwardly with respect to the stud 28. The function of the studs 28 and 29 will be presently referred to. The support 24, has the forward part of the body thereof provided with a circumferentially extending slot 30, which opens at the inner and outer faces of the body of the support, has its upper end positioned below the top of the support and its lower end positioned forwardly with respect to a standard, see Figure 5. The outer side of each support on the forward portion thereof is provided with a set of graduations or an adjustment scale as indicated at 31. Each support extends inwardly at an inclination from the rear to the front thereof, see Figure 2 and the supports are oppositely disposed with respect to each other.

Revolubly mounted in each support, is an adjustable carrier 32 consisting of a circular body portion, of the same cross sectional width as the cross sectional width of a support. The body portion of the carrier, has its edge formed with an annular flange 33 for engagement with that portion of largest inner diameter of the support. The shoulder 33 provides the carrier with two outer diameters and with the portion of largest outer diameter seating against the portion of largest inner diameter of the support and with the portion of smallest outer diameter of the carrier seating against the portion of smallest inner diameter of the support. The flange 33 provides the edge of the carrier 32 with a shoulder 34 which opposes the shoulder 26. The shoulder 34 arrests the outward shifting movement of the carrier 32 with respect to the support in which it is mounted, due to the fact that the shoulder 34 will abut the shoulder 26. The flanges 25 and 33 space a portion of the edge of the carrier 32 from a portion of the inner face of a support, see Figure 3. Operating in such space in a binding screw 35, carried by a support, and which is adapted to engage the edge of the carrier 32, for detachably securing it in adjusted position. The binding screw 35 has threaded engagement with a support and extends radially therefrom.

The carrier 32 is formed with a radially disposed opening 36 having a threaded wall and said opening 36 is positioned to one side of the flange 33. The opening 36 is of a length less than half the diameter of the carrier 32 and communicates with a diametrically extending slot 37 of a length greater than half the diameter of the carrier 32. The slot 37 extends in an opposite direction with respect to the opening 36 whereby the outer end of the slot and outer end of the opening will be diametrically opposed. The lengthwise opposed walls of the slot 37 are provided with concavities or grooves, of semi-cylindrical cross section, which are indicated at 38, and mounted in each groove 38 is a cylindrical bearing element 39. The bearing elements 39 are employed in connection with the sections of a condyle shaft to be presently referred to and each bearing element 39 has a small flat portion 40 which bears against a shaft section, see Figure 3. The outer face of the carrier 32 centrally thereof, is formed with a yoke-shaped rib 41 which registers with the edges of the slot 37, and said rib 41 has an outwardly flared inner side 42. The lengthwise opposed walls of the slots 37 incline in opposite directions with respect to each other, see Figure 3, and in cross section one wall extends rearwardly and outwardly and the other wall rearwardly and downwardly, see Figure 3.

The condyle shaft is formed of two oppositely disposed sections referred to generally by the reference characters 43, 44. The shaft sections are arranged in spaced relation and coupled together by the rear portion of the upper bow 2, see Figure 3. As each shaft section is of the same construction, but one will be described, as the description of one will apply to the other. Each shaft section comprises an inner cylindrical portion 45, a tapering intermediate portion 46 and a cylindrical outer portion 47. The inner portion 45 is of materially greater diameter than the outer portion 47. The inner cylindrical portion 45, in proximity to its outer end is provided with a reduced polygonal shaped part 48. The outer part 47 of the shaft section extends between a pair of bearing elements 39, as well as projecting outwardly from the carrier 32. The condyle shaft, which is formed of the sections 43, 44, can be adjusted to various angular positions and when so adjusted carries the upper bow 2 therewith, and for such purpose, there is associated with each shaft section, an adjusting screw therefor, indicated at 49, which extends into the slot 37, has threaded engagement with the wall of the opening 36, and bears against the outer portion 47 of a shaft section. The adjusting screw 49 carries a locking means 50. The adjusting screw 49 can shift the outer portion 47 of a shaft section the desired extent in the slot 37 between a pair of bearing elements 39, see Figure 5. The said screw 49 also provides means for adjusting the carrier 32, so as to position the slot 37, at various angular positions with respect to the axis of the support 24. The screw 49 will hold the outer portion 47 of the shaft section in adjusted positions and the binding screw 35 will maintain the carrier in the position to which it has been shifted by the screw 49. The extent of the shift can be gauged by the graduations 31.

The upper bow 2 consists of an upper and a lower section 51, 52 respectively and said sections are hollow to provide chambers 53, 54. The rear end of the upper bow 2 extends downwardly, in a curvilinear manner, as indicated at 55. The rear of the sections 51 and 52 are provided with registering grooves 56 which open into the chamber 54. Extending through the registering grooves 56 and chamber 54 is an operating shaft 57 having its forward end supported in the forward end of the bow 2, and said shaft 57 in proximity to its forward end is provided with a worm 58. Extending into the upper bow at the rear thereof, as well as being coupled with the shaft 57, is a flexible operating shaft or drive shaft 59 for the shaft 57.

The rear end of the lower section 52, of the bow 1, is formed with a pair of oppositely disposed sleeves 60 into which extend the inner ends of the inner portions 45 of the condyle shaft sections, and carried by the sleeve 60 are set screws 61 for securing the shaft sections to the lower section of the bow 2. The sections 51 and 52 are connected together by the hold fast devices 62.

The section 51 of the upper bow 2, near its forward end is provided with a vertical opening 63 and mounted therein is the hub 64 of a worm pinion 65, which is fixed to the vertically disposed revoluble shaft 66 of the incisal pin unit. The section 52 of the bow 2 is formed with a depending sleeve 67, through which extends shaft 66. The worm 58 meshes with the worm pinion 65 for the purpose of revolving the shaft 66. The upper portion of the shaft 66 is threaded and engaging therewith is an adjusting nut 68 for the purpose of vertically adjusting the shaft 66 when desired. The shaft 66 is constructed of an upper and a lower section and with the lower section threadedly and detachably engaging in the lower end of the upper section. The lower section is indicated at 69 and is peripherally threaded as at 70.

The incisal pin unit, not only includes the shaft 66, but it further includes a tubular coupling member 71 which detachably engages with the threads 70 of the lower section 69 of the shaft 66, whereby said coupling member 71 will bodily revolve with the shaft 66. Formed integral with the lower end of the coupling member 71, disposed at right angles with respect thereto, as well as being positioned to one side of the axis of the shaft 66, is a cam member 72 coacting with an incisal unit guide, to be presently referred to, for the purpose of imparting oscillatory and vertical movements to the upper bow 2 on the operation of the shaft 66.

The guide unit for the incisal pin unit consists of a V-shaped trough 73 closed at its forward end by a wall 74 and provided at each side of its top with a right angularly disposed lengthwise extending flange 75. Formed integral with the trough body is a pair of depending supports 76 which are mounted upon the seat 8. The trough body 73, intermediate the ends thereof, is provided with an integral depending arm having a squared upper portion 77 which slides in the slot 7, and a cylindrical lower portion 78 which depends below the forward portion 3 of the base 1. Threadably engaging with the cylindrical portion 78 and binding against the forward portion 3 of the base 1, is a clamping nut 79 for fixedly maintaining the guide or trough in adjusted position with respect to the seat 8. Threadably engaging with the wall 74 of the trough 73 is an adjustable screw 80, which coacts with the free end of the cam 72 for adjustably producing the protruded movements or bites.

In Figure 9 of the drawings the trough forming an element of the guide, is indicated at 81 and it is not provided with the support 76, but is directly mounted on the seat 8. Otherwise than that as stated the construction shown in Figure 9 is substantially the same as that shown in Figure 6.

The horizontal angular adjustment in one direction of the condyle shaft section 43 is had against the action of a strap spring 82, which bears against the polygonal shaped part 48 of said section, extends forwardly of and bears against the pin 28 and extends rearwardly of and bears against the pin 29. The horizontal angular adjustment in one direction of the condyle shaft section 44, is had against the action of a strap spring 83, which is arranged in the same manner as the strap spring 82.

Secured to the lower face of the upper bow 2 and to the upper face of the base 1, are monoplates indicated at 84.

When the shaft section 43 is angularly adjusted horizontally in a forward direction the shaft section 44 is shifted rearwardly, due to the fact that the shaft sections are coupled together by the rear end of the upper bow 2 and when the shaft section 44 is adjusted forwardly, the shaft section 43 is shifted rearwardly. The shaft sections can also be adjusted upwardly due to the positioning of the slots 37 to extend in an upward direction and said shaft sections can be adjusted downwardly, when the slots are adjusted to extend in a downward direction. The adjustment of the shaft sections horizontally, upwardly, or downwardly is had through the medium of the adjusting screws 49.

The trough 73, has secured therewith, throughout the upper face thereof a wear plate 75' against which operates the cam member 72, and the latter travelling against the inclined sides of the guide provide for the oscillatory and vertical movements of the upper bow 2.

The condyle shaft sections form bodily shiftable pivots for the upper bow 2, and which are shifted lengthwise of the slots 37, against the action of the springs 82, 83, whereby an oscillatory movement will be imparted to the bow 2.

An articulator, constructed in accordance with this invention, provides an efficient means for grinding in the teeth to obtain a thoroughly satisfactory occlusion for producing perfecting the individual three point contact, the rotation point, the inward slant, the downward slant and the incisal slant on the occlusion surfaces of the teeth, therefore it is thought the many advantages of an articulator, in accordance with this invention, can be readily understood, and although the preferred embodiment of the invention is as illustrated and described, yet it is to be understood that the changes in the details of construction can be had which will fall within the scope of the invention as claimed.

What I claim is:

1. A dental articulator comprising a pivoted upper bow, a revoluble incisal point unit depending therefrom and including at its lower end an angularly disposed cam positioned to one side of the longitudinal axis of the unit, a driven means carried by said bow and engaging with said unit for revolving it, a guide unit coacting with said cam to provide combined oscillatory and vertical movements for said bow, said guide unit being bodily adjustable and including means for fixedly securing it in its adjusted position, and said guide unit further including means coacting with said cam for controlling protruded movements.

2. A dental articulator comprising an incisal point unit including a cam, a guide unit therefor, said guide unit carrying adjustable means coacting with said cam for regulating protruded movements.

3. In a dental articulator a rotatable incisal point unit comprising a vertically disposed shaft including means adapted to be engaged by a driving element therefor for revolving the shaft, a coupling member detachably connected to the lower end of the shaft, and a cam carried by and disposed at right angles with respect to said member and positioned throughout to one side of the longitudinal axis of said member.

4. In a dental articulator a guide unit for a rotatable incisal point unit, said unit including a V-shaped trough, open at its rear end and closed at its forward end, means carried by the forward end of the trough for controlling protruded movements, and means depending from the trough for securing it stationary.

5. In a dental articulator a revolubly adjustable bearing means for an upper bow pivot, said means formed of a circular body portion provided with a diametrically extending slot and a diametrically extending opening communicating at its inner end with the inner end of the slot, said opening having the wall thereof threaded for engagement with an adjusting means for the body portion and pivot, bearing elements mounted in opposed walls of said slot for said pivot, said body portion having its outer face provided with a rib flush with the edge of the slot and with the inner face of the rib beveled outwardly, said slot having an open outer end.

6. In a dental articulator, an adjustable supporting structure for a condyle shaft section, said structure comprising a standard formed with an annulus at its upper end having extending from its inner face an annular flange outset with respect to the inner edge of the annulus to provide a shoulder, a circular disk mounted in said flange and annulus and provided with a peripheral shoulder opposing and spaced from the said other shoulder, said disk formed diametrically thereof with a rectangular slot and a circular opening having their outer ends at the edge of the disk and their inner ends opening into each other at the axis of the disk, the opposed walls of said slot being lengthwise grooved, the wall of said opening being threaded for connecting a shaft section adjusting element therewith, bearings mounted in and extending from said grooves, and said flange provided with an opening for the passage respectively of a locking element for the disk and the said adjusting element.

In testimony whereof, I affix my signature hereto.

WILLIAM M. GAMBILL.